United States Patent [19]
Ward

[11] 3,907,669
[45] Sept. 23, 1975

[54] SEPARATION PROCESS WITH REDUCED ENERGY CONSUMPTION
[75] Inventor: Dennis J. Ward, South Barrington, Ill.
[73] Assignee: Universal Oil Products Company, Des Plaines, Ill.
[22] Filed: Feb. 22, 1974
[21] Appl. No.: 445,017

[52] U.S. Cl. .............................. 208/341; 208/101
[51] Int. Cl. ................................................ C10g 5/04
[58] Field of Search .......................... 208/341, 101

[56] References Cited
UNITED STATES PATENTS

| | | | |
|---|---|---|---|
| 2,573,341 | 10/1951 | Kniel | 208/341 |
| 2,780,580 | 2/1957 | Kniel | 208/341 |
| 3,117,079 | 1/1964 | Harper | 208/341 |
| 3,574,089 | 4/1971 | Forbes | 208/341 |

Primary Examiner—Herbert Levine
Attorney, Agent, or Firm—James R. Hoatson, Jr.; Robert W. Erickson; William H. Page, II

[57] ABSTRACT

Lower energy consumption in a process for the separation and recovery of desired liquid and vapor constituents from a feed stream containing such constituents. The feed stream is contacted with a lean oil in an absorption zone. Resultant rich oil passes to a stripping zone and then to a fractionation zone. A portion of the lean oil is withdrawn from the stripping zone and the balance of the lean oil from the fractionation zone. Energy consumption is decreased because the portion of lean oil withdrawn from the stripping zone does not pass through the fractionation zone. One preferred embodiment is found in the recovery of LPG and stabilized gasoline from liquid and vaporous products of a fluid catalytic cracking process.

3 Claims, 1 Drawing Figure

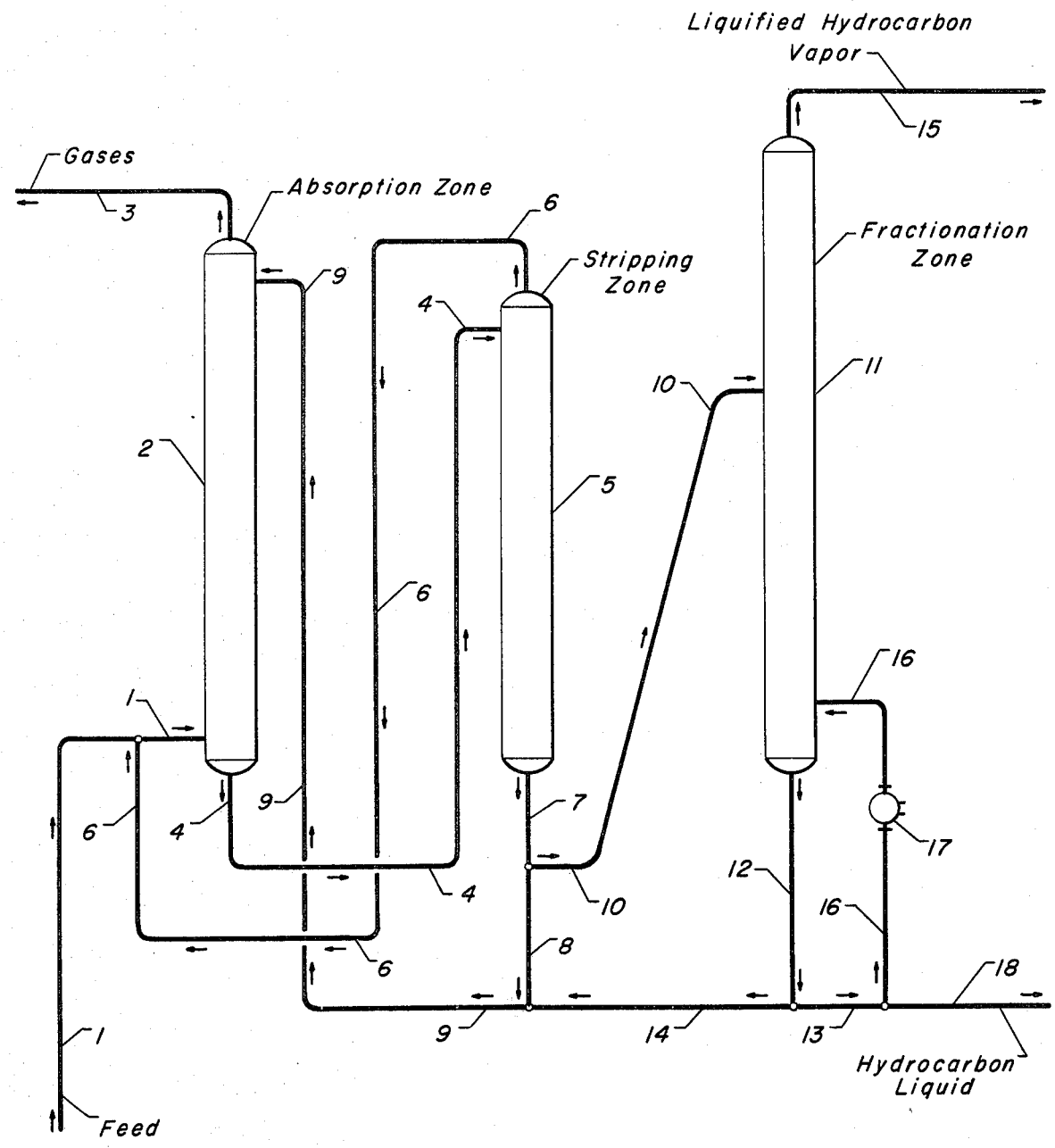

SEPARATION PROCESS WITH REDUCED ENERGY CONSUMPTION

BACKGROUND OF THE INVENTION

1. Field of the Invention

The field of art to which this invention pertains is hydrocarbon processing. It particularly relates to the recovery of desired liquid and vaporous constituents from a hydrocarbonaceous liquid-vapor feed stream. Specifically, this invention relates to the recovery of LPG and stabilized gasoline in an improved separation process.

2. Prior Art

Hydrocarbons which are vaporous at normal conditions are employed in the synthesis of many organic compounds. Ethylene, for example, is in demand as a starting material in the synthesis of alcohols and synthetic rubber. Propylene and butylenes are in particularly great demand for plastics manufacture and for conversion to high octane motor fuel blending components by polymerization and alkylation processes.

Sources of these vaporous hydrocarbons are petroleum cracking and conversion processes such as thermal cracking, catalytic cracking, reforming, hydrocracking, etc. The chemical reactions occurring in these processes produce commercially desirable quantities of vaporous hydrocarbons, and because of their utility it is desirable to recover them in as high a concentration as possible. For this reason, separation processes are commonly used to concentrate and recover these hydrocarbons.

Separation processes currently in use are comprised of three major sections or zones: absorption, stripping and fractionation. In essence, these zones serve, respectively, to absorb all but the lightest gaseous components, strip dissolved gases from the absorbed components, and fractionate the absorbed components into various product streams. An outstanding feature of these processes is that usually the heaviest components in the feed to the process are suitable for use as an absorber oil in the absorption zone. A portion of the product stream containing these components is recycled back to the absorption zone. This means, however, that the heavy material must pass again through the entire process, thereby consuming more energy, before leaving in the product stream.

I have discovered an improvement which significantly lowers the energy requirement of such hydrocarbon separation processes. Reduction of the energy requirement adds to the efficiency of the process and provides a unique utility in these times of hard-pressed energy sources.

OBJECTS AND EMBODIMENTS

It is an object of this invention to provide an improved method for the separation of hydrocarbons.

It is another object of this invention to provide a method for separating a liquid-vapor hydrocarbonaceous mixture into normally vaporous products and normally liquid products in a more economical manner. In one embodiment, my invention affords an improvement in a process for the recovery of selected hydrocarbon liquid and vapor constituents from a feed stream containing those constituents wherein (i) the feed stream contacts a lean oil in an absorption zone; (ii) a rich oil from the absorption zone passes to a stripping zone; (iii) a stripped oil from the stripping zone passes to a fractionation zone; (iv) a portion of fractionation zone bottoms is returned to the absorption zone as said lean oil, which improvement comprises returning to said absorption zone a mixture of stripped oil and fractionation zone bottoms as said lean oil.

BRIEF SUMMARY OF THE INVENTION

My invention involves a process for the recovery of normally vaporous and normally liquid hydrocarbonaceous components from a composite stream containing these components, such as an effluent stream from a hydrocarbon conversion zone.

A lean oil absorbs normally vaporous components from the composite stream in an absorption zone. Resulting rich oil passes to a stripping zone where light gases dissolved in the rich oil are removed and a stripped oil is produced. A first portion of the stripped oil returns to the absorption zone as lean oil; the remaining portion of stripped oil passes to a fractionation zone. The fractionation zone provides a liquefied hydrocarbon vapor product and a hydrocarbon liquid product. A portion of the hydrocarbon liquid product is combined with the aforesaid first portion of stripped oil and passed to the absorption zone as lean oil. Use of stripped oil as a portion of the lean oil stream reduces the duty, and therefore the energy requirement, of the fractionation zone.

BRIEF DESCRIPTION OF THE DRAWING

The attached drawing illustrates an embodiment of the present invention. Only such details are included as are necessary for a clear understanding of my invention, and no intention is thereby made to unduly limit its scope. Unnecessary items such as certain process streams, valves, pumps, instrumentation and other equipment have been omitted for the sake of simplicity.

Referring now to the separation process shown in the drawing, a feed stream comprising hydrogen, normally vaporous hydrocarbons such as methane, ethane, propane, etc., and normally liquid hydrocarbons such as pentane, hexane, etc. enters absorption zone 2 through conduit 1. A lean oil enters the top of absorption zone 2 in conduit 9, and passes downwardly therethrough, absorbing at least a portion of the vaporous hydrocarbon components of the feed. Gases not absorbed by the lean oil exit absorption zone 2 in conduit 3. A rich oil stream, containing liquid feed components, lean oil and absorbed gaseous and vaporous feed components, exits absorption zone 2 in conduit 4 and passes to stripping zone 5. Absorbed gases are removed from the rich oil in stripping zone 5 and pass in conduit 6 to conduit 1, intermixing therein with the feed. A stripped oil stream is withdrawn from stripping zone 5 in conduit 7. A portion of stripped oil exits conduit 7 in conduit 8 and passes to conduit 9, proceeding therethrough as lean oil to absorption zone 2. The remaining portion of stripped oil exits conduit 7 in conduit 10 and passes to fractionation zone 11 where this portion of stripped oil is separated into a liquefied hydrocarbon vapor product and a hydrocarbon liquid. The liquefied hydrocarbon vapor product is withdrawn from fractionation zone 11 and exits the process in conduit 15. The hydrocarbon liquid exits fractionation zone 11 in conduit 12. A portion of the hydrocarbon liquid exits conduit 12 in conduit 14 and passes to conduit 9, mixing therein with stripped oil from conduit 8 and passing as lean oil to absorption zone 2. The remaining portion of the hydrocarbon liquid is withdrawn from conduit 12 in conduit 13 and is separated into two fractions. One fraction is passed via line 16 through heat exchanger 17 and returned to fractionation zone 11 for the purpose of supplying the heat of fractionation. The fraction of hydrocarbon liquid remaining in conduit 13 exits the process as a hydrocarbon liquid product in conduit 18.

DETAILED DESCRIPTION OF THE INVENTION

The refining of petroleum involves numerous processes such as crude oil distillation, catalytic reforming of naptha, catalytic cracking of residual oils, etc. These processes are well known to those skilled in the art and need not be discussed in great detail herein. However, a characteristic of these processes and many others to be found in petroleum refineries and hydrocarbon processing plants is the production of components which are broadly referred to herein as "normally vaporous hydrocarbons" and "normally liquid hydrocarbons." Normally vaporous hydrocarbons are hydrocarbons which at "normal" conditions of temperature and pressure exist in the vapor state. Conditions referred to in the art as normal conditions are a pressure of 1 atmosphere and a temperature of 60°F. When normally vaporous hydrocarbons are transformed from the vapor state to the liquid state, they are said to become liquefied hydrocarbon vapors. Normally liquid hydrocarbons are those which exist in the liquid state at normal conditions. The present invention broadly provides a method for separating the effluent from any petroleum or hydrocarbon refining or conversion process which contains the types of components which are referred to as normally vaporous and normally liquid hydrocarbons.

For illustrative purposes, the present invention will be described with reference to the effluent from a fluid catalytic cracking process. Normally liquid and normally vaporous hydrocarbons from a fluid catalytic cracking unit conventionally leave in the liquid and vapor streams from the fractionation zone of the unit. These streams are sent to a separation process for recovery of a stabilized liquid hydrocarbon product, or stabilized gasoline, liquefied hydrocarbon vapors and light gases. The stabilized gasoline product principally comprises hydrocarbons having five or more carbon atoms per molecule. This gasoline is referred to as stabilized because it does not contain light materials such as ethane or propane or hydrogen which would contribute effervescence to the gasoline. The liquefied hydrocarbon vapor from the separation process substantially comprises hydrocarbons having from three to four carbon atoms per molecule and includes such compounds as propane, butylenes and the like. Liquefied hydrocarbon vapor is commonly referred to in the art as liquefied petroleum gas, or LPG. This product may be further processed in downstream fractionation facilities if it is desired to produce further purified hydrocarbon product streams such as, for example, a stream substantially comprising hydrocarbons of only three carbon atoms. The light gas stream from the separation process commonly contains compounds such as methane, ethane, and hydrogen. These light components are valuable primarily as fuel and are conducted from the separation process to a fuel system.

In the embodiment of the separation process of my invention shown in the attached drawing, an admixture of normally liquid hydrocarbons and normally vaporous hydrocarbons and hydrogen enters near the bottom of absorption zone 2 through conduit 1. It should be noted that this is only one preferred embodiment. Another preferred embodiment would be to introduce the vaporous portion of the feed as shown and to introduce the liquid portion of the feed near the top of the absorption zone. The considerations involved here are: (a) the vaporous portion of the feed should traverse upwardly as many contact stages as possible within the absorption zone such that soluble components of the vapor are dissolved into liquid within the absorption zone to the greatest extent possible; (b) if the liquid portion of the feed comes to the separation process substantially unsaturated in soluble vaporous components, then it should enter the absorption zone nearer the top in order to pass as many absorption stages as necessary to absorb as much as possible of these vaporous components. Therefore, this second preferred embodiment of points of introduction of the feed to the absorption zone can be desirable when the configuration of the upstream fluid catalytic cracking unit is such that liquid and vapor portions of the feed are delivered to the separation process in separate conduits and when the liquid portion arrives at the separation process unsaturated in soluble vaporous feed components.

Absorption zone 2 may be one or more vertically disposed plate or packed absorption towers, having a total of 20 or more contact stages. The absorption zone is maintained at conditions selected to absorb at least a portion of the soluble vaporous components of the feed into the liquid within the absorption zone. These conditions include a pressure of from about 150 to 400 psig and a temperature of from about 80° to 150°F. A preferred range of pressure is from 150 to 250 psig. Absorption being normally exothermic, it may be necessary to provide one or more heat removal means to prevent the temperature within the absorption zone from exceeding these limits. A preferred range of temperature of the effluent streams from absorption zone 2 is 100° to 140°F. The heat removal means can be a system, such as those well known in the art, which removes liquid from an otherwise overheated stage within the absorption zone, pumps this liquid through a cooling device and returns the cooled liquid to the stage immediately below. Liquid flowing downward within the absorption zone, counter-current to upward-flowing vapors, is provided by a stream of lean oil which enters at the top of absorption zone 2 in conduit 9. This oil is referred to as being lean because it is substantially less than saturated with vaporous feed components. In flowing downwardly through the absorption zone, the lean oil absorbs vaporous feed components and a portion of gaseous feed components, and upon exiting absorption zone 2 in conduit 4 it is referred to as rich oil. Gases which have not been absorbed by the lean oil are withdrawn from the top of absorption zone 2 in conduit 3. Rich oil withdrawn from absorption zone 2 in conduit 4 is introduced near the top of stripping zone 5.

As was indicated above, it is desired that the hydrogen, methane and ethane exit the separation process as gases in conduit 3 and that the propane, propylene, butanes and butylenes exit the process as liquefied hydrocarbon vapor in conduit 15. Ideally, therefore, the rich oil entering stripping zone 5 would contain no hydrogen, methane, or ethane. However, a portion of the hydrogen, methane and ethane in the feed is unavoidably absorbed in the rich oil, and the primary function of the stripping zone is to remove these absorbed gases. Stripping zone 5 may be a conventional vertically disposed plate or packed tower provided with heat input means to furnish the heat for stripping. These heat input means may be a conventional kettle reboiler or other such device. The stripping tower should preferably have 20 or more contact stages. Feed to the stripping tower preferably enters at or near the top in order that rich oil provides liquid for rectification in all contact stages. Vapor generated through boiling of liquid in the heat input means flows upwardly in the stripping zone and counter-currently contacts the rich oil. The rectification which ensues enriches the vapor in the lighter components such that vapor withdrawn from stripping zone 5 in conduit 6, referred to as stripped vapor, contains substantially all of the hydrogen, methane and ethane which entered stripping zone 5 with the rich oil. Because the stripped vapor also contains some heavier materials, it is returned in conduit 6 to conduit 1 and enters absorption zone 2 with the feed. In this manner the heavier materials which have unavoidably been stripped from the rich oil may be recovered, and the gaseous material in the stripped vapor may leave the absorption zone in conduit 3. Rich oil, after being stripped of absorbed gases in stripping zone 5, is referred to as stripped oil and exits stripping zone 5 in conduit 7. This stripped oil is suitable for use as lean oil and is divided into two fractions. One fraction of stripped oil exits conduit 7 in conduit 10 and passes to fractionation zone 11. The remaining fraction of stripped oil exits conduit 7 in conduit 8 and passes to conduit 9, proceeding therein as lean oil to absorption zone 2.

Stripped oil entering fractionation zone 11 in conduit 10 is fractionated into an overhead liquid material and a bottoms liquid material. The bottoms liquid material, which is suitable for use as lean oil, exits fractionation zone 11 in conduit 12. A portion of bottoms liquid material exits conduit 12 in conduit 14, passes to conduit 9, mixing therein with stripped oil from conduit 8, and passes in conduit 9 to absorption zone 2. The portion of bottoms material remaining in conduit 12 exits in conduit 13. A fraction of the bottoms material in conduit 13 exits in conduit 16 and passes through heat input device 17 before returning to fractionation zone 11. In this manner the heat necessary for fractionation is introduced into the fractionation zone. The fraction of bottoms material remaining in conduit 13 exits the process in conduit 18 as a stabilized hydrocarbon liquid product and principally comprises hydrocarbons having five or more carbon atoms. Fractionation zone 11 may be a conventional, vertically oriented, plate or packed fractionation tower, having 25 or more contact stages, and furnished with overhead vapor condensing means. Fractionation zone feed preferably enters at or near the middle of the fractionation tower. The fractionation zone also has means for returning a portion of the overhead liquid material (condensed overhead vapor) to the fractionation tower as reflux. The remaining portion of overhead liquid material exits fractionation zone 11 in conduit 15 as a liquefied hydrocarbon vapor product. The liquefied hydrocarbon vapor product comprises hydrocarbons having three or four carbon atoms per molecule.

The separation zone of my invention is particularly useful and novel by virtue of its low energy consumption. Traditional designs of separation processes pass all of the stripped oil to the fractionation zone. In these processes this large amount of stripped oil must be fractionated before a portion of fractionation zone bottoms material is returned to the absorption zone as lean oil. I have discovered that the stripped oil is suitable for use as lean oil, and, therefore, a portion of the stripped oil can be passed directly to the absorption zone without first being fractionated. This portion of stripped oil represents a decrease in the amount of oil which must be fractionated, decreasing the feed to the fractionation zone. Since the fractionation zone has a lower feed rate, its consumption of energy is decreased. The mole ratio of stripped oil to fractionation zone bottoms material in the lean oil should be from about 1:1 to about 10:1. A preferable range of this ratio is from about 2:1 to about 4:1. The following example is furnished to demonstrate the decrease in energy requirement.

A conventional separation process is modified to include, as an option, operation according to my invention. The following data illustrate the quantities of components in the various process streams when operating the process according to two cases: Case I, conventional operation; Case II, according to the present invention. Note that all quantities are expressed in pound moles per hour and reference should be made to the attached drawing for identification of the process stream by conduit number.

| CONDUIT NO. | 1 | 14 | 8 | 7 | 3 | 15 | 12 | 18 |
|---|---|---|---|---|---|---|---|---|
| COMPONENT: | | | | CASE I | | | | |
| Light Gases ($H_2$, $C_1$, $C_2$) | 506.1 | — | — | 0.1 | 506.0 | 0.1 | — | — |
| $C_3$ | 220.6 | — | — | 198.6 | 22.0 | 198.6 | — | — |
| $C_4$ | 109.3 | 1.0 | — | 109.0 | 1.3 | 102.1 | 6.9 | 5.9 |
| $C_5+$ | 581.0 | 199.0 | — | 780.0 | — | — | 780.0 | 581.0 |
| TOTALS | 1417.0 | 200 | NONE | 1087.7 | 529.3 | 300.8 | 786.9 | 586.9 |
| | | | | CASE II | | | | |
| Light Gases ($H_2$, $C_1$, $C_2$) | 506.1 | — | — | 0.1 | 506.0 | 0.1 | — | — |
| $C_3$ | 220.6 | — | 33.9 | 232.5 | 22.0 | 198.6 | — | — |
| $C_4$ | .109.3 | 0.5 | 18.5 | 127.0 | 1.3 | 102.1 | 6.4 | 5.9 |
| $C_5+$ | 581.0 | 50.0 | 107.6 | 738.6 | — | — | 631.0 | 581.0 |
| TOTALS | 1417.0 | 50.5 | 160.0 | 1098.2 | 529.3 | 300.8 | 637.4 | 586.9 |

It is to be noted that the recoveries of the liquefied hydrocarbon vapor, the stabilized hydrocarbon liquid and the gases are identical in the two cases. However, the feed to the fractionation zone (the sum of streams 14 plus 15 plus 18) has decreased from 1087.7 pound moles per hour to 937.2 pound moles per hour in operating according to the present invention. The heat input necessary for the fractionation zone has decreased from 11.8 million BTU per hour to 9.9 million BTU per hour, a saving of 1.9 million BTU per hour of heat energy, or approximately 16 percent.

I claim as my invention:

1. A process for the recovery of selected products from a vaporous mixture of normally gaseous and gasoline boiling hydrocarbons and hydrogen which comprises the steps of:
   a. countercurrently contacting said mixture with an absorber oil in an absorption zone under conditions to absorb in said oil and separate from the mixture hydrocarbons of more than two carbon atoms per molecule;
   b. removing from the upper portion of said zone hydrogen and hydrocarbons of less than three carbon atoms per molecule;
   c. removing from the lower portion of said zone a rich absorber oil containing the absorbed hydrocarbons and entrained hydrogen and hydrocarbons of less than three carbon atoms;
   d. stripping said rich absorber oil of hydrogen and hydrocarbons of less then three carbon atoms in a stripping zone, thereby forming a stripped oil principally comprising hydrocarbons of three and more carbon atoms per molecule, including gasoline boiling hydrocarbons;
   e. supplying said hydrogen and hydrocarbons of less than three carbon atoms stripped from said rich absorber oil in said stripping zone to the lower portion of said absorption zone;
   f. supplying a portion of said stripped oil to said absorption zone as a portion of said absorber oil;
   g. fractionating the remainder of said stripped oil in a fractionation zone maintained under conditions to separate the same into a liquefied petroleum gas product and a stabilized gasoline product;
   h. supplying a portion of said stabilized gasoline product to said absorption zone as another portion of said absorber oil; and
   i. recovering the remainder of said stabilized gasoline product and said liquefied petroleum gas product.

2. The process of claim 1 further characterized in that said portion of said stripped oil and said portion of said stabilized gasoline product are supplied in admixture to the upper portion of said absorption zone.

3. The process of claim 1 further characterized in that the mole ratio of said portion of the stripped oil to said portion of the stabilized gasoline product supplied to the absorption zone is in the range of about 1:1 to 10:1.

* * * * *